Patented May 27, 1952

2,598,635

UNITED STATES PATENT OFFICE 2,598,635

METHOD OF PREPARING ADDUCTS

Joachim Dazzi, Dayton, Ohio, assignor to Monsanto Chemical Company, St. Louis, Mo., a corporation of Delaware No Drawing. Application April 11, 1950, Serial No. 155,341

13 Claims. (Cl. 260—404.8)

This invention relates to improvements in the preparation of adducts formed by the addition reaction of maleic anhydride with olefinic, non-conjugated fatty acids of from 10 to 24 carbon atoms and esters of said acids. It has particular reference to improving the color and clarity of such adducts.

The preparation of adducts by reaction of maleic anhydride with unsaturated fatty acids is well-known. (See U. S. Patent No. 2,188,882, to Clocker and the article by Ross, Gebhart, and Gerecht, which appears in the Journal of the American Chemical Society, p. 1373 (1946).) While the structure of such adducts has not been definitely determined, it is believed that addition of the fatty acid or ester thereof, occurs at the double bond of the dicarboxylic acid. For example, the maleic anhydride-oleic acid adduct probably has the structure:

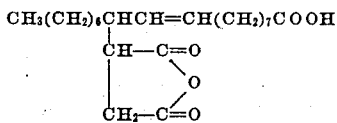

Owing to the uncertainty of the position of the fatty acid carbon at which attachment of the dicarboxylic residue occurs, as well as for the sake of brevity, the term "adducts" employed hereinafter will refer to the equimolar addition products of maleic anhydride and a fatty acid compound having the general formula YCOOZ wherein Y is an olefinic, aliphatic hydrocarbon residue of from 9 to 23 carbon atoms and Z is hydrogen or an alkyl group of from 1 to 8 carbon atoms.

Such adducts are compounds of great potential use in the chemical and related industries. Actual utilization of the adducts, however, has been somewhat limited by their poor color. For example, when following the procedure employed in the prior art there are generally obtained, even when using very pure grades of reactants, opaque reaction materials of a dark color that makes them unsuitable for many uses for which they could be otherwise employed.

Accordingly an object of the present invention is to provide a method for improving the color of such adducts.

Another object of the invention is to provide a method for preventing, or at least minimizing, decolorization of the product in the addition reaction of maleic anhydride and monoolefinic, unsubstituted fatty acids.

These and other objects of the invention may be accomplished by the process of the invention in which the condensation of maleic anhydride and an olefinic non-conjugated fatty acid is conducted in the presence of a phosphorus compound having the general formula:

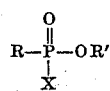

in which R is a member of the group consisting of alkyl, phenyl, alkylphenyl, xenyl, and naphthyl radicals of from 2 to 12 carbon atoms and their mono-chloro substitution products, R' is a member of the group consisting of hydrogen and R, and X is a member of the group consisting of R, OR and OH.

One group of compounds having the above general formula comprises phosphonic acids and their esters having the general formula:

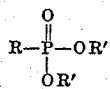

in which R is as defined above and R' is a member of the group consisting of hydrogen and R. As examples of phosphonic acids and phosphonates having this structure may be mentioned n-butanephosphonic acid, n-hexanephosphonic acid, diethyl dodecanephosphonate, diphenyl n-octanephosphonate, (isopropyl) (ethyl) decanephosphonate, di-n-amyl benzenephosphonate, α-naphthalenephosphonic acid, bi-phenylphosphonic acid, diethyl chlorobenzenephosphonate, di-p-tolyl benzenephosphonate, bis(p-chlorophenyl) n-hexanephosphonate, ethylbenzenephosphonic acid, etc.

Another group of compounds encompassed by the present invention consists of phosphinic acids and their esters having the general formula

in which R is as defined above and R' is a member of the group consisting of hydrogen and R. As illustrative of phosphinic acids and phosphinates useful for decreasing color formation of maleic anhydride-fatty acid adducts may be mentioned dibutylphosphinic acid, bis(2-ethylhexyl)phosphinic acid, the ethyl ester of di-n-octylphosphinic acid, the chloroethyl ester of dibutylphosphinic acid, di-dodecylphosphinic acid, diphenylphosphinic acid, dixenylphosphinic acid, the chlorophenyl ester of diphenylphosphinic acid, the isobutyl ester of bis(p-ethylphenyl)-phosphinic acid, etc.

While I do not know the mechanism of the color-inhibiting effect of phosphorus compounds when employed in the reaction mixture, it may be assumed that they either react with some impurity or impurities that may be present in the reactants or that they retard side reactions which contribute to the darkening of the desired adducts. Inasmuch as the addition reaction readily takes place in the absence of the phosphorus compounds, the action of the added material cannot be considered to be catalytic. Only very small quantities of the phosphorus compound need to be employed, say, from 0.5 per cent by weight to 5.0 per cent by weight of the maleic anhydride employed. Less than 0.3 per cent generally has substantially no decolorizing effect and while quantities in excess of 5.0 per cent may be employed, for purposes of economy it is preferred to limit the range of the additive to not more than 5 per cent, this quantity being sufficient to give adducts of greatly improved color.

The invention is further illustrated, but not limited, by the following example:

EXAMPLE

In this example there is summarized a series of experiments which were made according to the following general procedure:

Into a three-necked flask fitted with an agitator, thermometer, condenser and an inlet tube there were placed the unsaturated fatty acid, the maleic anhydride and the phosphorus compound. The molar ratio of maleic anhydride:oleic acid used varied between 1:1 and 1.25:1. The off gases or traces of maleic anhydride were collected over a very diluted aqueous sodium hydroxide and a few drops of phenolphthalein.

The whole mixture was heated during a 30 minute period from room temperature up to 200° C. (liquid temperature). An inert gas, i. e., nitrogen, was bubbled through the liquid during the first 15 minutes of the half-hour heating period. After a 4 to 6 hour heating period at the temperatures indicated in the table below, the mixture was cooled to approximately 150° C., then treated with clay and a filter aid, and stirred for 30 minutes. The reaction mixture was subsequently treated with charcoal and stirring was continued for an additional 30 minutes at 150 to 165° C. The product was then filtered over a filter aid. The filtrate was diluted with ether, washed several times with water and the wash water was analyzed for maleic anhydride. Low boiling materials were removed by heating the residue for 1 to 2 hours at 100° C. bath temperature at a pressure of 1 mm. Hg. The yields varied between 86 to 96 per cent and were based on the determination of unreacted maleic anhydride found in the filtrate and in the solid residue minus the equivalent used to neutralize the charged phosphorus compound. This method was also checked by polarographic determination of maleic anhydride found in the filtrate before and after the water wash.

Table

| Experiment No. | 1 | 2 | 3 | 4 | 5 |
|---|---|---|---|---|---|
| P Compound | | (5) | (6) | (7) | (8) |
| Emersol-233 [1] | 13.8 | 13.8 | 13.8 | 13.8 | 13.8 |
| Maleic Anhydride | 6.0 | 6.0 | 6.0 | 6.0 | 6.0 |
| Percent P Compound used [2] | 0.0 | 2 | 2 | 2 | 2 |
| Mole Ratio: Maleic Anhydride/Fatty Acid | 1.25 | 1.25 | 1.25 | 1.25 | 1.25 |
| Heating Time (Hrs.)[3] | 5 | 5 | 5 | 5 | 5 |
| Temperature ° C | 214 | 214 | 214 | 214 | 214 |
| Color [4] | 16.3 | 14.2 | 12.3 | 14.3 | 12.0 |

[1] Emersol-233, (Emery Industries) represents distilled oleic acid, technical.
[2] Based on charged maleic anhydride.
[3] After reaction mixture had been brought to 200° C.
[4] Gardner Scale (Gardner color standards for varnishes, oils and lacquers).
[5] N-octanephosphonic acid.
[6] Bis-(p-chlorophenyl)phosphinic acid.
[7] Diethyl benzene phosphonate.
[8] Diphenyl 2-ethyl-hexane-phosphonate.

Quantities of reactants indicated above are parts by weight.

All of the above experiments were carried out in large test tubes fitted with cork stoppers wrapped in metal foil. All were heated simultaneously in the same oil bath.

As shown in the above table, in the "blank" experiment 1, the color of the adducts on the Gardner scale was 16.3. The efficiency of the introduced phosphorus compound is shown by the decreased color value of the adducts prepared in the presence of the phosphonates. Inasmuch as each unit in the upper range of the Gardner scale, i. e., in color values of from 7 to 16, represents a decidedly significant color change, the results obtained by the present process are remarkable.

Since formation of the present adducts involves addition of one mole of the maleic anhydride with one mole of the fatty acid compound, these reactants should be present in substantially stoichiometric proportions. The quantity of either reactant actually present in the initial mixture is unimportant, in that any excess material is readily recoverable from the final reaction mixture. The reaction is effected at temperatures which are below the decomposition points of either the reactants or the product, and preferably between temperatures of, say, between 150° C. to 300° C.

Although the above example shows only the use of oleic acid as the fatty acid component, other mono-olefinic, unsubstituted fatty acids, e. g., 10-undecylenic acid, may be similarly reacted with maleic anhydride in the presence of the present phosphorus compounds to give adducts of good color. Also instead of using the free fatty acids, there may be employed esters of the same with aliphatic, unsubstituted alcohols of from 1 to 8 carbon atoms, e. g., methyl, ethyl, isopropyl, n-hexyl or 2-ethylhexyl undecylate or oleate, the adducts thus obtained being clearer and lighter in color than adducts prepared by prior methods.

While I prefer to add the phosphorus compound to the mixture of maleic anhydride and the fatty acid component before initiating the reaction good results are obtained when the present phosphorus compounds are added at an intermediate stage of the reaction. For example, the reaction mixture may be heated for a time of, say, one to two hours in the absence of the phosphorus compound, and the reaction interrupted for addition of the latter. However, color improvement is not so pronounced.

While the addition of maleic anhydride with mono-olefinic, unsubstituted acids occurs readily at ordinary atmospheric pressures, with some reactants use of lower or greater pressures is advantageous. The addition reaction may also be effected in the presence of an inert high boiling diluent, the use of a diluent being recommended when working with the higher esters, e. g., n-octyl oleate.

What I claim is:

1. The process of preparing adducts which comprises heating at temperatures of from 150° C. to 300° C. a mixture comprising maleic anhydride, a fatty acid compound having the general formula YCOOZ wherein Y is a non-conjugated olefinic, aliphatic hydrocarbon residue of from 9 to 23 carbon atoms and Z is a member of the group consisting of hydrogen and alkyl radicals of from 1 to 8 carbon atoms, and a phosphorus compound having the general formula:

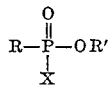

in which R is a member of the group consisting of alkyl, phenyl, alkylphenyl, xenyl and naphthyl radicals of from 2 to 12 carbon atoms and their mono-chloro substitution products, R' is a member of the group consisting of hydrogen and R, and X is a member of the group consisting of R, OR and OH, the quantity of said phosphorus compound being from 0.5 percent to 5.0 percent by weight of the weight of the maleic anhlydride.

2. The process of claim 1 further defined in that the fatty acid compound is oleic acid.

3. The process of claim 1 further defined in that the fatty acid compound is undecylenic acid.

4. The process of preparing adducts which comprises heating at temperature of from 150° C. to 300° C. a mixture comprising maleic anhydride, a fatty acid compound having the general formula YCOOZ wherein Y is non-conjugated olefinic, aliphatic hydrocarbon residue of from 9 to 23 carbon atoms and Z is a member of the group consisting of hydrogen and alkyl radicals of from 1 to 8 carbon atoms, and a phosphorus compound having the formula

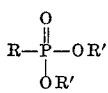

in which R is a member of the group consisting of alkyl, phenyl, alkylphenyl, xenyl and naphthyl radicals of from 2 to 12 carbon atoms and their mono-chloro substitution products and R' is a member of the group consisting of hydrogen and R, the quantity of said phosphorus compound being from 0.5 per cent to 5.0 per cent by weight of the weight of the maleic anhydride.

5. The process of claim 4 further defined in that the fatty acid compound is oleic acid.

6. The process of claim 4 further defined in that the fatty acid compound is undecylenic acid.

7. The process of preparing adducts which comprises heating at temperatures of from 150° C. to 300° C. a mixture comprising maleic anhydride, a fatty acid compound having the general formula YCOOZ wherein Y is a non-conjugated olefinic, aliphatic hydrocarbon residue of from 9 to 23 carbon atoms and Z is a member of the group consisting of hydrogen and alkyl radicals of from 1 to 8 carbon atoms, and a phosphorus compound having the general formula

in which R is a member of the group consisting of alkyl, phenyl, alkylphenyl, xenyl and naphthyl radicals of from 2 to 12 carbon atoms and their mono-chloro substitution products, and R' is a member of the group consisting of hydrogen and R, the quantity of said phosphorus compound being from 0.5 per cent to 5.0 per cent by weight of the weight of the maleic anhydride.

8. The process of claim 7 further defined in that the fatty acid compound is oleic acid.

9. The process of claim 7 further defined in that the fatty acid compound is undecylenic acid.

10. The process of preparing adducts which comprises heating at temperatures of from 150° C. to 300° C. a mixture comprising maleic anhydride, oleic acid and n-octanephosphonic acid, the quantity of said phosphonic acid being from 0.5 percent to 5.0 percent by weight of the weight of maleic anhydride.

11. The process of preparing adducts which comprises heating at temperatures of from 150° C. to 300° C. a mixture comprising maleic anhydride, oleic acid and bis(p-chlorophenyl)phosphinic acid, the quantity of said phosphinic acid being from 0.5 per cent to 5.0 percent by weight of the weight of the maleic anhydride.

12. The process of preparing adducts which comprises heating at temperatures of from 150° C. to 300° C. a mixture comprising maleic anhydride, oleic acid and diethyl benzenephosphonate, the quantity of said phosphonate being from 0.5 percent to 5.0 percent by weight of the weight of the maleic anhydride.

13. The process of preparing adducts which comprises heating at temperatures of from 150° C. to 300° C. a mixture comprising maleic anhydride, oleic acid and diphenyl 2-ethylhexanephosphonate, the quantity of said phosphonate being from 0.5 percent to 5.0 percent by weight of the weight of the maleic anhydride.

JOACHIM DAZZI.

REFERENCES CITED

The following references are of record in the file of this patent:

UNITED STATES PATENTS

| Number | Name | Date |
|---|---|---|
| 2,306,281 | Rust | Dec. 22, 1942 |